(12) United States Patent
Lateb et al.

(10) Patent No.: US 8,421,296 B2
(45) Date of Patent: Apr. 16, 2013

(54) ROTOR FOR ELECTRIC MOTOR OPTIMIZED FOR HIGH POWER

(75) Inventors: Ramdane Lateb, Champigneulles (FR); Patrick Verdot, Nancy (FR)

(73) Assignee: Converteam Technology Ltd., Warwickshire (GB)

( * ) Notice: Subject to any disclaimer, the term of this patent is extended or adjusted under 35 U.S.C. 154(b) by 293 days.

(21) Appl. No.: 12/924,534

(22) Filed: Sep. 29, 2010

(65) Prior Publication Data

US 2011/0084568 A1 Apr. 14, 2011

(30) Foreign Application Priority Data

Sep. 30, 2009 (FR) ..................................... 09 56809

(51) Int. Cl.
*H02K 17/18* (2006.01)
*H02K 17/16* (2006.01)

(52) U.S. Cl.
USPC .......................................... 310/212; 310/211

(58) Field of Classification Search ........... 310/211–212
See application file for complete search history.

(56) References Cited

U.S. PATENT DOCUMENTS

| | | | | |
|---|---|---|---|---|
| 1,495,861 A | * | 5/1924 | Macmillan | 310/212 |
| 1,508,152 A | * | 9/1924 | Alger | 310/212 |
| 1,752,104 A | * | 3/1930 | Myers | 310/212 |
| 2,242,007 A | * | 5/1941 | Leader | 310/212 |
| 2,350,012 A | * | 5/1944 | Brady | 310/211 |
| 5,495,133 A | * | 2/1996 | Bawin et al. | 310/211 |
| 5,512,792 A | | 4/1996 | Bawin et al. | |
| 6,088,906 A | * | 7/2000 | Hsu et al. | 310/211 |
| 2005/0156476 A1 | | 7/2005 | Nishihama et al. | |
| 2006/0273683 A1 | | 12/2006 | Caprio et al. | |
| 2011/0081263 A1 | * | 4/2011 | Yoshino et al. | 417/410.1 |

FOREIGN PATENT DOCUMENTS

| | | |
|---|---|---|
| DE | 908 277 | 4/1954 |
| DE | 3113530 | 10/1983 |
| DE | 0 608 0675 | 8/1994 |
| JP | 48012681 | 4/1973 |
| JP | 57183241 | 11/1982 |
| JP | 08168219 A * | 6/1996 |
| WO | 2007000424 | 1/2007 |

OTHER PUBLICATIONS

"High bar for electric machines with displacement current runner" From The New Technology vol. V592, No. 3/4, Apr. 1, 1960, pp. 2-2, XP001460683.

* cited by examiner

*Primary Examiner* — Tran Nguyen
(74) *Attorney, Agent, or Firm* — Davidson, Davidson & Kappel, LLC

(57) ABSTRACT

A rotor for a high power electric motor intended to operate at particularly high rotational speeds. It includes a magnetic mass, gripped on either side by short circuit rings, and passed through at a plurality of notches by main bars forming a squirrel cage. The rotor also includes secondary bars passing through the magnetic mass via notches. The shape and arrangement of each notch is defined so as to ensure contact between the main bars and the secondary bars sufficient to allow the passage of an electric current when the rotor is in rotation. In particular, the invention applies to asynchronous motors capable of operating at high peripheral speeds typically starting at 100 m·s$^{-1}$, in particular motors intended for gas or oil applications, whether land-, sea-, or undersea-based.

11 Claims, 3 Drawing Sheets

ROTOR FOR ELECTRIC MOTOR
OPTIMIZED FOR HIGH POWER

This claims the benefit of French Patent Application FR 09 56809, filed Sep. 30, 2009 and hereby incorporated by reference herein.

BACKGROUND

The present invention concerns a rotor for a high power electric motor intended to operate at particularly high rotational speeds. In particular, the invention applies to asynchronous motors capable of operating at high peripheral speeds typically starting at 100 m·s$^{-1}$, in particular motors intended for gas or oil applications, whether land-, sea-, or undersea-based.

High power electric motors capable of operating at high rotational speeds have a number of applications. The manufacture of motors meeting the growing requirements in terms of power and speed impose new constraints, in particular mechanical ones, concerning the rotors of said motors. Patent documents EP 0 608 675 A1 and U.S. Pat. No. 5,512,792 describe particularly effective embodiments of rotors for asynchronous electric motors, operating at high powers and speeds. Thus is described a rotor whereof the bars constituting the squirrel cage can freely expand, thereby making it possible to lessen the effects due to thermal imbalances.

SUMMARY OF THE INVENTION

Nevertheless, in order to further increase the power received by this type of motor, increasing the diameter of the bars making up the squirrel cage is necessary to avoid excessive heating of the latter parts. However, based on the examples described in the aforementioned patents, increasing the sections of said bars amounts to reducing the distances between those same bars. This solution is therefore not very satisfactory, since reducing the spacing between each bar introduces new magnetic and mechanical constraints, which results, in fine, in making the rotor more fragile.

The invention aims to propose a rotor capable of being integrated into an electric motor with improved characteristics in terms of supported power and peripheral rotational speeds, in particular through its capacity to convey greater electrical power through the squirrel cage of said rotor.

The present invention provides a rotor for a high speed and high power electrical motor including, along the axis of the rotor, a magnetic mass, formed by assembling magnetic sheets, gripped on either side by short circuit rings, and passed through at a plurality of notches by electric conductors connecting the short circuit rings to form a squirrel cage, characterized in that:

the electric conductors have, on at least part of their length, an oblong section with a large axis extending substantially radially in relation to the longitudinal axis of the rotor, the electric conductors are formed by assembling main bars and secondary bars passing through the magnetic mass via notches, the shape and arrangement of each notch being defined so as to ensure contact between the main bars and the secondary bars sufficient to allow the passage of an electric current when the rotor is in rotation, and the secondary bars being made in the same material as the main bars, and each secondary bar has a length smaller than the length of the magnetic mass to make it possible to obtain clearance between each secondary bar and the short circuit rings, ensuring the free expansion of the secondary bar in its notch.

According to specific embodiments, the rotor includes one or several of the following features:

the rotor further comprises means for fastening the secondary bars in relation to the magnetic mass arranged so as to allow each secondary bar to expand symmetrically on either side of said fastening means;

the rotor further comprises means for fastening the main bars in relation to the magnetic mass, sharing a same orifice with the means for fastening the secondary bar;

the section of each secondary bar includes at least one portion capable of fitting a contour of the portion of the section of each corresponding main bar capable of coming into contact with said secondary bar when the rotor is in rotation;

the section of the main bar corresponds to a flat truncated disc shape and the section of the secondary bar is substantially trapezoidal, the flat portion of the truncated disc of the section of the main bar being arranged so as to come into contact with the base of the trapezoid of the section of the secondary bar when the rotor is in rotation;

the section of the main bar and the section of the secondary bar correspond to a flat truncated disc shape, the flat portion of the truncated disc of the section of the main bar being arranged so as to come into contact with the flat portion of the truncated disc of the secondary bar when the rotor is in rotation;

the section of the main bar corresponds substantially to a disc, and the section of the secondary bar corresponds to a truncated disc shape from which a portion of a disc has been removed equivalent to that of the section of the main bar, the portion of the disc of the section of the main bar being arranged so as to come into contact with the truncated portion of the disc of the secondary bar when the rotor is in rotation;

the ends of the main bars are freely arranged in orifices formed at the periphery of the short circuit rings; and each orifice has inner dimensions larger than those corresponding to the dimensions of the outer shape of the end of the main bar it receives, so as to leave play allowing the free expansion of the end of said main bar in the orifice.

The invention also concerns a motor capable of driving the rotor as defined above at a peripheral speed greater than or equal to 100 m·s$^{-1}$.

Another advantage of the present invention is that it makes it possible to significantly improve the power supported by motors such as those described in patent documents EP 0 608 675 and U.S. Pat. No. 5,512,792 without causing profound changes in the structure of the existing rotors. Moreover, the invention does not cause any differential expansion that risks creating thermal imbalances detrimental to the motor's operation.

BRIEF DESCRIPTION OF THE DRAWINGS

Other features and advantages of the present invention will better appear upon reading the description that follows of one embodiment provided as an illustration and non-limitingly, appended with figures that illustrate.

DETAILED DESCRIPTION

The invention, in particular the rotor according to the invention, is applicable to motors capable of operating at high peripheral speeds, typically starting at 100 m·s$^{-1}$. The rotor according to the invention is in particular adapted to use within asynchronous electric motors, in particular intended for gas or oil applications, whether land-, sea-, or undersea-based.

Figure 1:
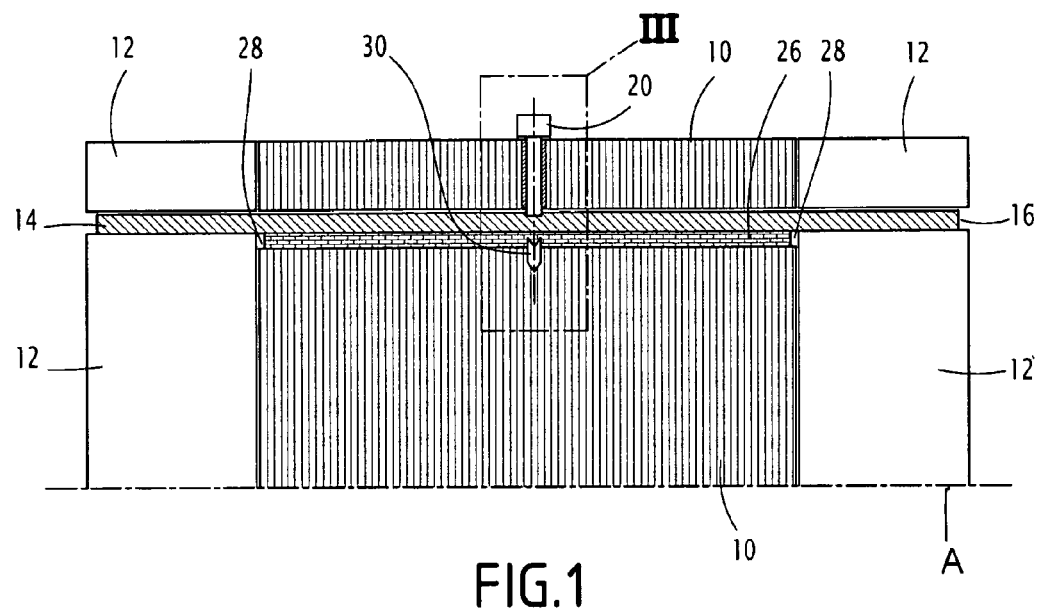
FIG. 1, a longitudinal cross-section of a portion of a rotor according to the invention.
Figure 2:
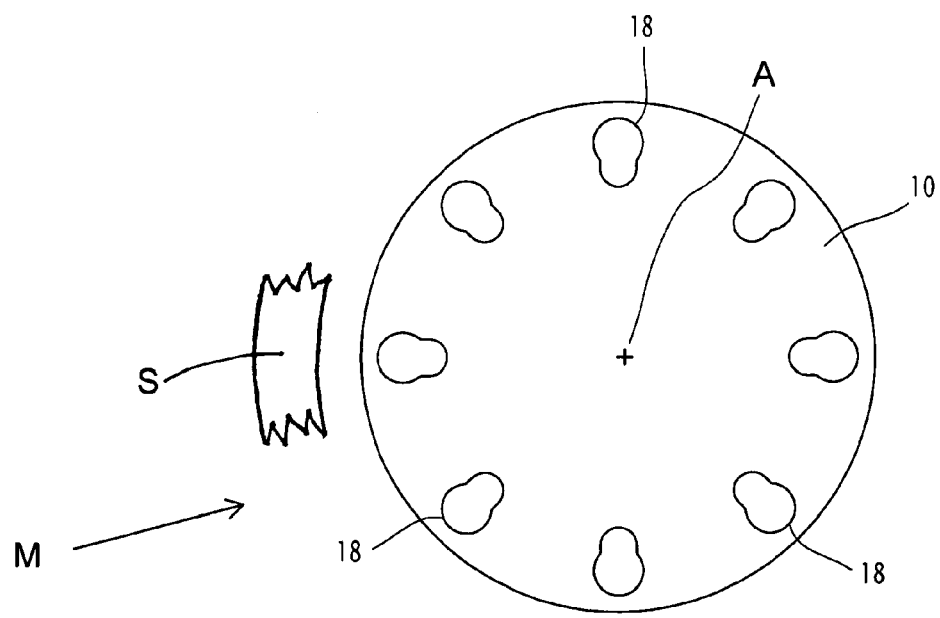
FIG. 2, a transverse cross-section of the magnetic mass.

FIG. 1 shows a longitudinal cross-section of a portion of a rotor according to one embodiment of the invention. The rotor thus illustrated is adapted to cooperate with a stator S (shown schematically in FIG. 2) and shafts to form motor M (FIG. 2). The rotor includes a magnetic mass 10 gripped on either side by short circuit rings 12. The magnetic mass 10 can be an assembly of magnetic sheets whereof the production, in particular the gripping device of said sheets, is described in particular in U.S. Pat. No. 5,512,792.

The rotor includes electric conductors capable of conducting, through the magnetic mass 10, electric currents applied to the rotor by the short circuit rings 12. The electric conductors also include main bars 14 whereof the ends are freely arranged in orifices 16 formed at the periphery of the short circuit rings 12. Each orifice 16 has substantially the same shape as the end of the main bar 14 that it receives. Likewise, each orifice 16 has inner dimensions larger than those corresponding to the dimensions of the outer shape of the end of the main bar 14 it receives. This spacing thus allows play to remain that in particular allows the free expansion of the end of the main bar 14 in the orifice 16. The orifices 16 can be produced by boring.

Each main bar 14 passes through the magnetic mass 10 via a notch 18, as illustrated by FIG. 2 showing a transverse cross-section of the magnetic mass 10. It will be noted that the notch 18 is preferably radially closed, i.e. it does not have a radial opening, such that the contact between the main bar 14 and the magnetic mass 10 is optimal.

The section of the main bars 14 preferably includes at least one circular or practically circular portion. Each main bar 14 is then arranged such that its circular portion is oriented toward the outside in relation to the axis of rotation of the rotor A. Thus when the rotor is in rotation, it is the circular portion of the main bar 14 that increases its bearing on the notch 18 under the effect of the centrifugal force. The main bars 14 are made of copper or a copper alloy. The short circuit rings 12 as well as the main bars 14 form the squirrel cage of the rotor. The main bars 14 are also fastened to the magnetic mass 10 in a single point using any appropriate fastening means 20, e.g. such as a screw, a pin or any fastening device, method and accessory.

Figure 3:
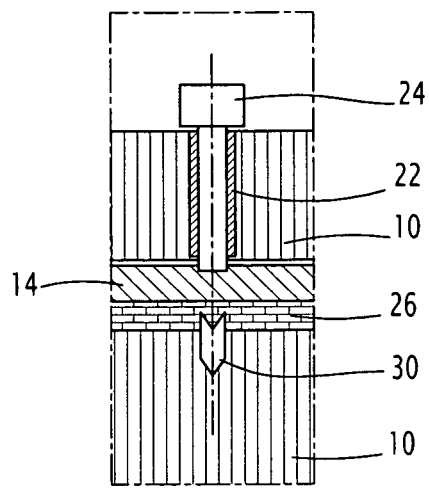
FIG. 3, the detail of a means for fastening the main and secondary bars.

FIG. 3 illustrates an embodiment of a fastening means 20. A receiving hole 22 in the magnetic mass 1 emerging in the notch 18 including the main bar 14 is produced substantially in the middle of the magnetic mass 1, perpendicular to the axis of rotation of the rotor. The receiving hole 22 includes a threading in which a screw 24 is introduced. The screw 24 makes it possible to apply pressure on the main bar 14.

Figure 4:
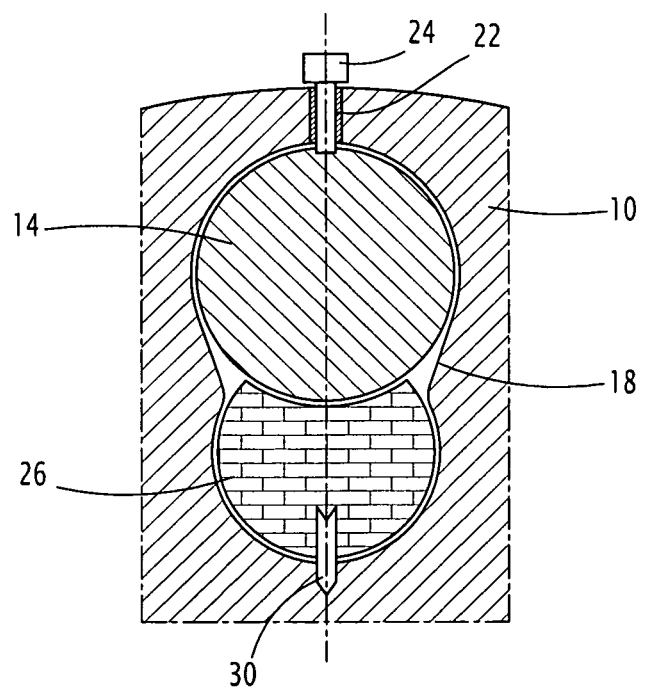
FIG. 4, a transverse cross-section of a notch including a main bar and a secondary bar.

The electric conductors of the rotor also include secondary bars 26 introduced into the notches 18 of the magnetic mass 10 jointly with the main bars 14. Each secondary bar 26 preferably has a length slightly smaller than the length of the magnetic mass 10. In this case, play 28 is obtained between each secondary bar 26 and the short circuit rings 12, ensuring the free expansion of the secondary bars 26 in the notches 18 of the magnetic mass 10. The electric conductors of the rotor therefore have, over a portion of their length, an oblong section with a large axis extending radially in relation to the longitudinal axis of the magnetic mass 10. The secondary bars 26 are made from the same material as the main bars, in particular copper. They can be fastened in relation to the magnetic mass 10 in a single point using suitable fastening means 30, such as for example a screw, a pin, or any fastening device, method and accessory. FIGS. 3 and 4 illustrate such an embodiment. The fastening means 30 are made up of a fastening slug arranged substantially at the center of the magnetic mass 10 at the notch 18, and driven into the secondary bar 26. The fastening means 30 then shares the receiving hole 22 of the fastening means 20. The fastening means 30 and 20 ensure axial locking of the main bars 14 and secondary bars 26 in relation to the rotor. The fastening means 30 and 20 do not necessarily ensure radial locking of the main bars 14 and secondary bars 26 in relation to the rotor. The fastening means 30 allow the secondary bar 26 to expand, in particular under the effect of the temperature, symmetrically on either side of the fastening means 30.

The shape and arrangement of each notch 18 of the magnetic mass 10 are chosen so as to allow the simultaneous passage of one of the main bars 14 and one of the secondary bars 26 and to ensure contact between said main bar 14 and said secondary bar 26 sufficient to allow the passage of an electrical current when the rotor is in rotation.

FIG. 4 shows a transverse cross-section of a notch 18 wherein one of the main bars 14 and one of the secondary bars 26 are introduced. The notch 18 has a substantially circular or practically circular shape in its portion capable of coming into contact with the main bar 14 (upper portion of the notch 18 in FIG. 4) under the effect of the centrifugal force when the rotor is in rotation. The notch 18 has a shape substantially equivalent to the shape of the portion of the secondary bar 26 capable of coming into contact with the notch 18 (lower portion of the notch 18 in FIG. 4).

The secondary bar 26 can assume different forms. However, the section of the secondary bar 26 includes at least one portion capable of fitting the contour 32 of the portion of the section of the corresponding main bar 14 capable of coming into contact with the secondary bar 26 under the effect of the centrifugal force when the rotor is in rotation.

Figure 5:
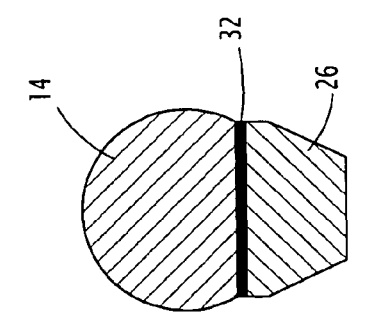
Figure 6:
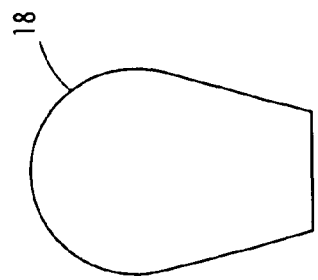

FIG. 5 shows a first example of a shape of the main bar 14 and secondary bar 26 sections. The section of the main bar 14 corresponds to a flat truncated disc shape in its lower portion. The section of the secondary bar 26 is substantially trapezoidal. In this configuration, the contour 32 is substantially in the shape of a straight segment, the flat portion of the truncated disc of the section of the main bar 14 being arranged so as to come into contact with the base of the trapezoid of the section of the secondary bar 26 under the effect of the centrifugal force when the rotor is in rotation. FIG. 6 shows an example of the shape of the notch 18 suitable for receiving the main bar 14 and the secondary bar 26 illustrated by FIG. 5.

Figure 7:
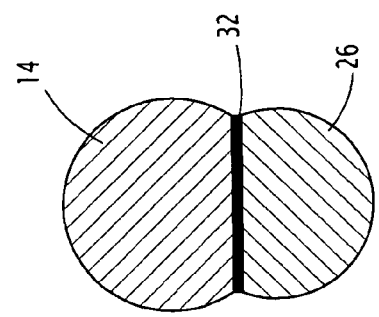
Figure 8:
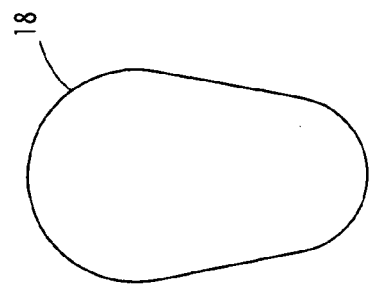

FIG. 7 shows a second example of a shape of the main bar 14 and secondary bar 26 sections. The section of the main bar 14, just like the section of the secondary bar, corresponds to a flat truncated disc shape, in its lower portion for the main bar 14, in its upper portion for the secondary bar 26. In this configuration, the contour 32 substantially has the shape of a straight segment, the flat portion of the truncated disc of the section of the main bar 14 being arranged so as to come into contact with the flat portion of the truncated disc of the secondary bar 26 under the effect of the centrifugal force when the rotor is in rotation. FIG. 7 shows an example of the shape of the notch 18 suitable for receiving the main bar 14 and the secondary bar 26 illustrated by FIG. 8.

Figure 9:
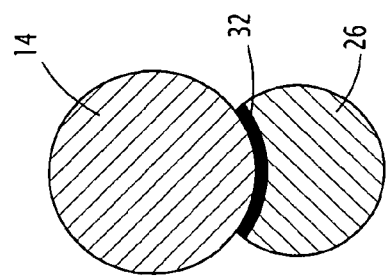
Figure 10:
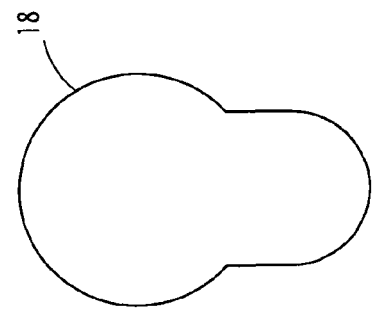
FIGS. 6, 8, 10, examples of notch shapes according to the shape of the sections of the main bars and secondary bars.

FIG. 9 shows a third example of a shape of the main bar 14 and secondary bar 26 sections. The section of the main bar 14 corresponds substantially to a disc while the section of the secondary bar corresponds to a truncated disc shape from which a portion of a disc has been removed equivalent to that of the section of the main bar 14. In this configuration, the contour 32 is substantially in the shape of an arc of circle, the bottom portion of the disc of the section of the main bar 14 being arranged so as to come into contact with the truncated portion of the disc of the secondary bar 26 under the effect of the centrifugal force when the rotor is in rotation. FIG. 10 shows an example of the shape of the notch 18 suitable for receiving the main bar 14 and the secondary bar 26 illustrated by FIG. 9.

Figure 11:
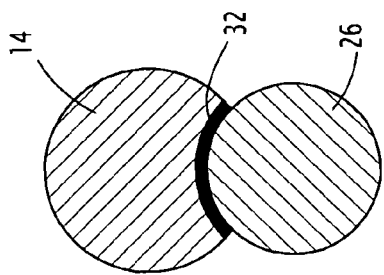
FIGS. 5, 7, 9, 11, examples of shapes of sections of main bars and secondary bars.

FIG. 11 illustrates sections of bars adapted to the notch of FIG. 10. Opposite the arrangement of FIG. 9, the secondary bar 16 has a circular section while the main bar 14 has a globally circular section with a hollow truncated portion capable of partially receiving the secondary bar 26. The truncated portion has a shape complementary to that of the secondary bar.

The dimensions of the notch 18 as well as those of the main bar 14 and the secondary bar 26 are adjusted such that the play between the main bar 14 and the secondary bar 26 is sufficient to ensure contact allowing the passage of an electric current when the rotor is in rotation. The play between the main bar 14 and the secondary bar 26 is in particular dimensioned taking into account the expansion coefficient of the materials used to manufacture the main bar 14 and the secondary bar 26, as well as taking the assembly constraints of the rotor into account. Whatever the case may be, this contact is also more pronounced as the rotational speed of the rotor increases, in the presence of the centrifugal forces and under the effect of the heat expansion.

Alternatively, the magnetic conductors of the rotor can be formed in a single metal bar with an oblong section over a portion of the length passing through the magnetic mass 10.

The invention is particularly adapted to high power motors running at high rotational speeds, typically peripheral speeds starting at 100 m·s$^{-1}$. This type of motor is generally controlled by frequency changers. Starting up the motor only requires a small electric current due to the applications for which these types of motors are intended, i.e. their use in compressors or pumps. In this case, a slight pressure of the main bar 14 in the orifice 16 is sufficient to allow the passage of a weak current. Moreover, for the same reasons, the section of the main bar 14 alone ensures the passage of the weak electric current on start-up and consequently the contribution of the secondary bar 26 is practically nonexistent due to the small play separating the main bars 14 and the secondary bars 26. When the motor increases its speed, the centrifugal force becoming increasingly significant, the latter deforms:

of the main bar 14, which will then exert pressure on the inner face of the orifice 16 in the short circuit rings 8 and thereby create a more significant contact;

the secondary bar 26, which will bear on the main bar 14 while fitting its shape, thereby ensuring a more significant contact and then increasing the passage section of the current.

Simultaneously, when the motor increases its power, the heating phenomena, becoming increasingly significant within the rotor, create the expansion of:

main bar 14, which will then exert pressure on the inner face of the orifice 16 in the short circuit rings 12 and thereby create a more significant contact;

the secondary bar 26, which will bear on the main bar 14 while fitting its shape, thereby ensuring a more significant contact and then increasing the passage section of the current.

What is claimed is:

1. A rotor for a high speed and high power electrical motor comprising:
    a magnetic mass along a longitudinal axis of the rotor, the magnetic mass formed by assembling magnetic sheets, gripped on either side by short circuit rings, the magnetic mass having a plurality of notches; and
    electric conductors passing through the magnetic mass at the plurality of notches and connecting the short circuit rings to form a squirrel cage;
    the electric conductors having, on at least part of a length of said electric conductors, an oblong section with a large axis extending substantially radially in relation to the longitudinal axis of the rotor;
    the electric conductors being formed by assembling main bars and secondary bars passing through the magnetic mass via the notches, a shape and arrangement of each notch being defined so as to ensure contact between the main bars and the secondary bars such that said contact allows a passage of an electric current when the rotor is in rotation, the secondary bars being made of same material as the main bars;
    each secondary bar having a length smaller than a length of the magnetic mass to permit a clearance between each secondary bar and the short circuit rings and ensuring a free longitudinal expansion of the secondary bar in a respective notch of the notches.

2. The rotor as recited in claim 1 further comprising at least one fastener fastening the secondary bars in relation to the magnetic mass and arranged so as to allow each secondary bar to expand symmetrically on either side of the fastener.

3. The rotor as recited in claim 2 further comprising at least one further fastener fastening the main bars in relation to the magnetic mass and sharing a same orifice with the at least one fastener.

4. The rotor as recited in claim 1 wherein each secondary bar includes at least one portion capable of fitting a contour of each corresponding main bar, the contour capable of coming into contact with the secondary bar when the rotor is in rotation.

5. The rotor as recited in claim 4 wherein the contour of the main bar has a flat truncated disc and the at least one portion of the secondary bar is substantially trapezoidal, a flat portion of the truncated disc being arranged so as to contact a base of the trapezoidal portion of the secondary bar when the rotor is in rotation.

6. The rotor as recited in claim 4 wherein the contour of the main bar and the at least one portion of the secondary bar each correspond to a flat truncated disc shape, a flat portion of the truncated disc shape of the contour of the main bar being arranged so as to come into contact with a further flat portion of the truncated disc shape of the secondary bar when the rotor is in rotation.

7. The rotor as recited in claim 4 wherein the contour of the main bar corresponds substantially to a disc, and whereof the at least one portion of the secondary bar corresponds to a truncated disc shape therefrom a portion of a disc has been removed equivalent to that of the disc of the main bar, the contour of the main bar being arranged so as to come into contact with the truncated disc shape of the secondary bar when the rotor is in rotation.

8. The rotor as recited in claim 1 wherein ends of the main bars are freely arranged in orifices formed at the periphery of the short circuit rings.

9. The rotor as recited in claim 8 wherein each orifice has inner dimensions larger than those corresponding to the dimensions of an outer shape of the respective end of the main bar the orifice receives, so as to leave play allowing the free expansion of the end of the main bar in the orifice.

10. A motor capable of driving the rotor as recited in claim 1 at a peripheral speed greater than or equal to $100 \text{ m·s}^{-1}$.

11. A method for operating the rotor as recited in claim 1 in a motor capable of driving the rotor at a peripheral speed greater than or equal to $100 \text{ m·s}^{-1}$.

\* \* \* \* \*